(12) United States Patent
Horng

(10) Patent No.: US 6,265,797 B1
(45) Date of Patent: Jul. 24, 2001

(54) SUPPORTING STRUCTURE FOR A MOTOR ROTOR

(75) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 09/453,073

(22) Filed: Dec. 2, 1999

(51) Int. Cl.⁷ ....................................................... H02K 5/16
(52) U.S. Cl. ................................................. 310/90; 310/91
(58) Field of Search ........................... 310/90, 91; 29/596

(56) References Cited

U.S. PATENT DOCUMENTS

| | | | |
|---|---|---|---|
| 4,955,791 | * | 9/1990 | Wrobel ................................. 417/354 |
| 5,065,060 | * | 11/1991 | Takahashi et al. ....................... 310/74 |
| 5,093,599 | * | 3/1992 | Horng ................................. 310/254 |
| 5,610,462 | * | 3/1997 | Takahashi .............................. 310/90 |
| 5,831,355 | * | 11/1998 | Oku ....................................... 310/42 |
| 6,097,121 | * | 8/2000 | Oku ....................................... 310/91 |

* cited by examiner

Primary Examiner—Joseph Waks
(74) Attorney, Agent, or Firm—Bacon & Thomas, PLLC

(57) ABSTRACT

A supporting structure for a motor rotor includes a fixing member having an axle seat for engaging with an axle tube, which is tightly engaged with the stator bobbin. The axle tube includes a bearing mounted therein for pivotally holding the rotor shaft. A support element is mounted to an end of the axle tube for supporting an end of the rotor shaft. The support element may include a recess or a through-hole in a bottom thereof and covered by a pad. The rotor includes a ring magnet for induction with the stator coil. The rotor further includes a number of through-holes on a top surface thereof through which posts of a die are extended to allow the posts to bear against an end flange of the axle tube when pressing the support element into the axle tube.

2 Claims, 3 Drawing Sheets

SUPPORTING STRUCTURE FOR A MOTOR ROTOR

BACKGROUND OF THE INVENTION

1. Field of the Invention

The present invention relates to a supporting structure for a motor rotor that includes a support member secured in the axle tube for supporting an end of the rotor shaft, thereby allowing stable rotation of the rotor.

2. Description of the Related Art

Applicant's U.S. patent application Ser. No. 09/366,636 filed on Aug. 4, 1999 discloses positioning structures for a motor rotor, wherein an axle tube 3 is extended through a stator bobbin 1 and a circuit board 2 and includes a bearing 31 mounted in the axle tube for pivotally support a rotor shaft 41 of the rotor 4. A support element 32 is mounted to a lower end of the axle tube 32 for supporting a lower end of the rotor shaft 41. Thus, the rotor shaft rotates stably about a fixed axis. Rotational noise of the motor is lowered and life of the motor is lengthened.

Nevertheless, a pressing process is required to securely position the support element 32 in the axle tube 3 to thereby prevent disengagement of the supporting element 32. During assembly, the axle tube 3 is incapable of resisting the pressure from the support element 32 at pressing process and thus the stator bobbin 1 and the circuit board 2 may be loosen and displaced from the axle tube, which is undesired.

SUMMARY OF THE INVENTION

It is a primary object of the present invention to provide a supporting structure with a support member for a motor rotor, wherein the axle tube is capable of resisting the pressure from the support element to thereby retain the axle tube in place without displacement at pressing process.

It is a secondary object of the present invention to provide a supporting structure with a support member for a motor rotor, thereby providing a better heat dissipating effect and lengthening the life of the motor.

It is another object of the present invention to provide a supporting structure with a support member for a motor rotor, wherein the support element for supporting the rotor shaft provides a better shock-absorbing effect to lower rotational noise of the motor and lengthen the life of the motor.

In accordance with the present invention, the rotor further includes a number of through-holes on a top surface through which posts of a die are extended to thereby allow the posts to bear against an end flange of the axle tube. The die resists the pressure from the support element during pressing of the support element, thereby retaining the axle tube in place. Heat generated during rotation of the rotor and heat from the stator winding can be dissipated via the through-holes on the top surface of the rotor, thereby providing a better heat-dissipating effect. A bottom of the support element has a hole defined therein and covered by a pad that supports an end of the rotor shaft for absorbing the load from the rotor shaft.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Figure 1:
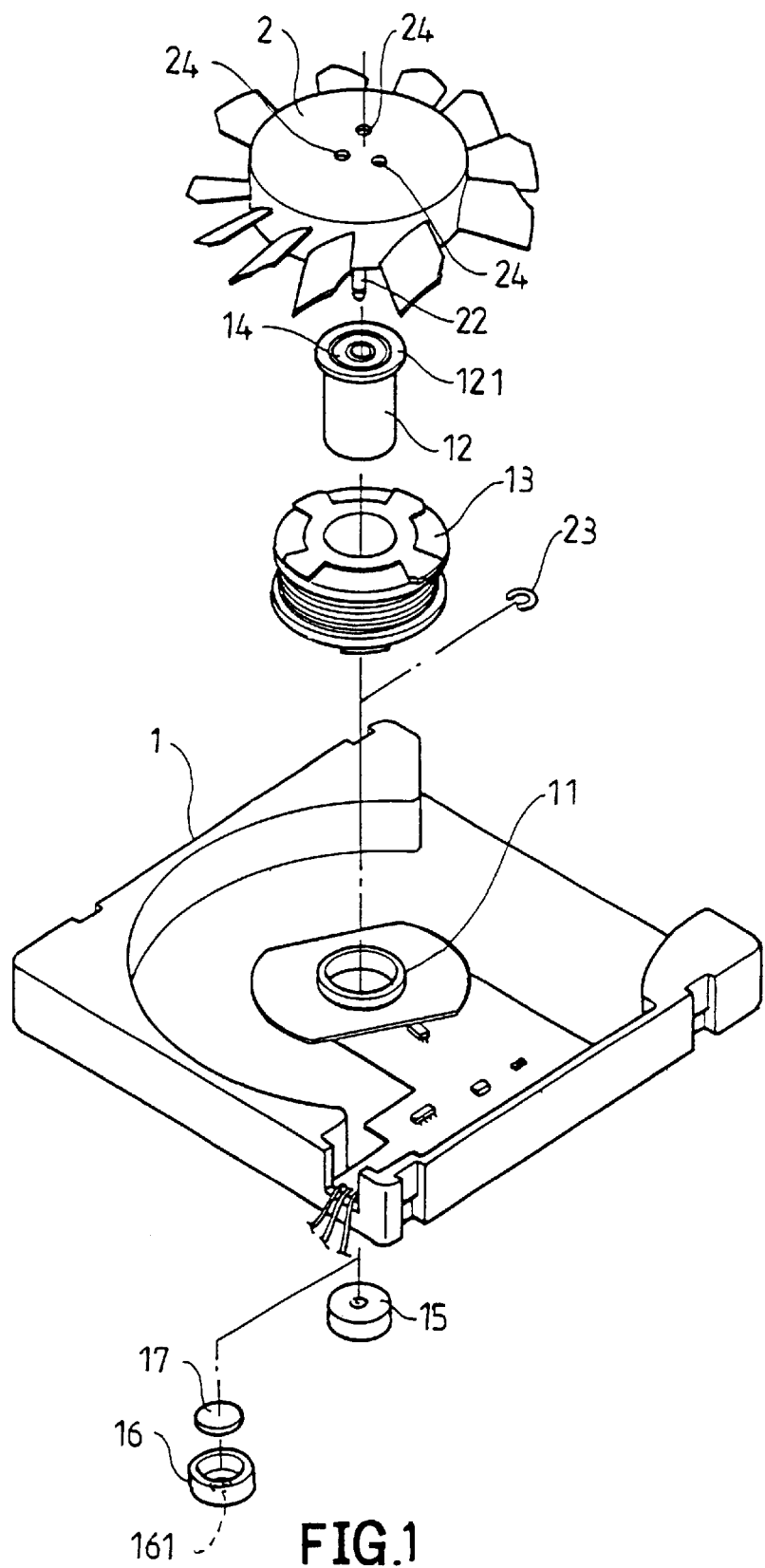
FIG. 1 is an exploded perspective view of a motor with a supporting structure in accordance with the present invention.
Figure 2:
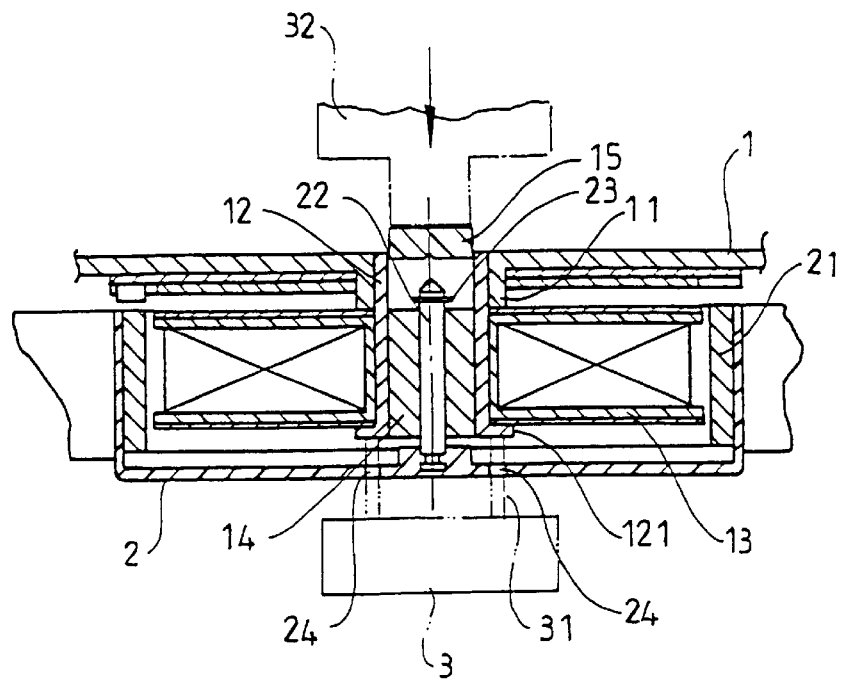
FIG. 2 is a sectional view of the motor rotor in FIG. 1, illustrating an assembly procedure of the motor.
Figure 5:
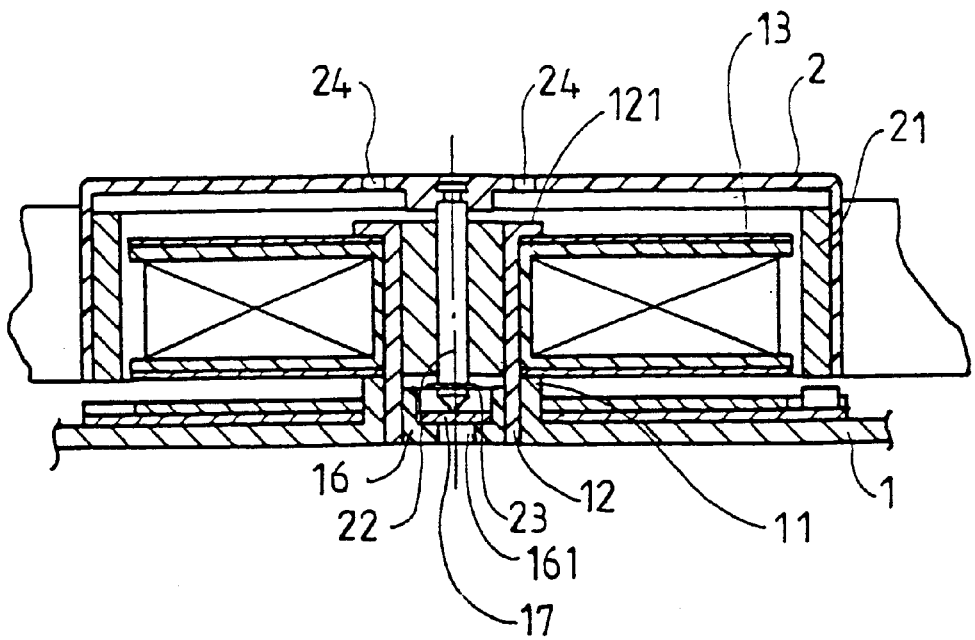
FIG. 5 is a sectional view similar to FIG. 2, illustrating a motor with a second embodiment of the supporting structure in accordance with the present invention.

Referring to FIGS. 1 and 2, a motor with a supporting structure in accordance with the present invention generally includes a fixing member 1 and a rotor 2. The fixing member 1 may be a housing of a heat-dissipating fan. The fixing member 1 includes an axle seat 11 for engaging with an axle tube 12. The axle tube 12 includes a flange 121 formed on an end thereof and a stator bobbin 13 mounted therearound. A bearing 14 is mounted inside of the axle tube 12. A support element 15 is tightly mounted into the other end of the axle tube 12 by means of pressing, which will be described later. The support element 15 may be a solid lid. In an alternative design of the invention, the support member (now designated by 16) has a hole 161 that may be a recess or a through-hole 161 and covered by a pad 17, as shown in FIG. 5.

The rotor 2 may include blades (not labeled) to form a conventional impeller. The rotor 2 includes a ring magnet 21 (FIG. 2) for induction with coil of the stator bobbin 13. The rotor 2 includes a rotor shaft 22 pivotally held by the bearing 14 in the axle tube 12, thereby rotating about a fixed axis. The rotor shaft 22 includes an annular groove (not labeled) so as to be retained by a retainer element 23 (e.g., a C-clip). A distal lower end of the rotor shaft 22 rests on a support element 15 (FIG. 4) or a pad 17 (FIG. 5). The rotor 2 further includes a number of through-holes 24 on a top surface thereof that align with the flange 121 of the axle tube 12. Posts 31 of a die 3 (FIG. 2) are extended through the through-holes 24 to allow the posts 31 to bear against the flange 121 of the axle tube 12 during pressing process. Preferably, the through-holes 24 of the rotor 2 are equi-spaced angularly about a center of the rotor.

Figure 3:
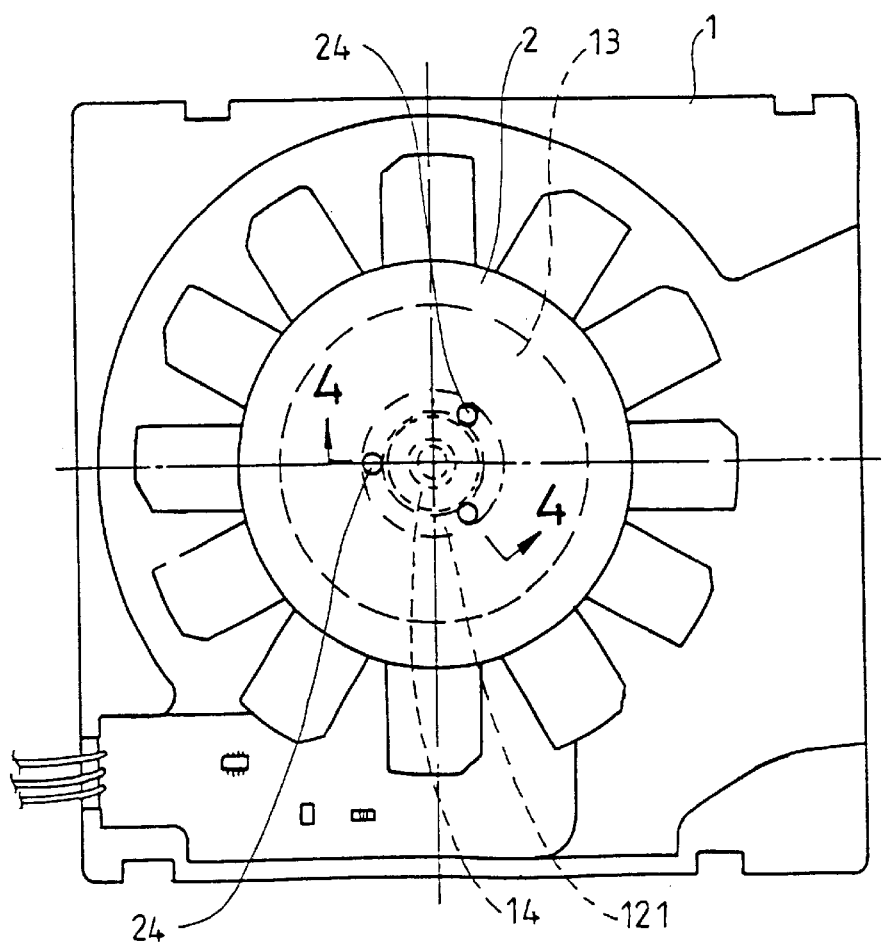
FIG. 3 is a top view of the motor in accordance with the present invention.
Figure 4:
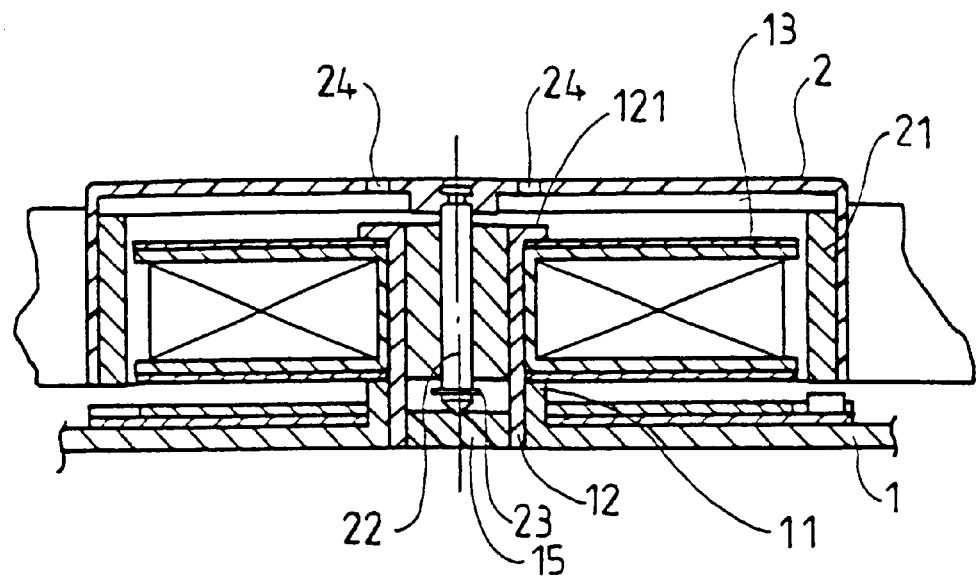
FIG. 4 is a sectional view taken along line 4—4 in FIG. 3.

In assembly process, as illustrated in FIG. 2, the axle tube 12 with the stator bobbin 13 mounted therearound is tightly engaged on the axle seat 11 of the fixed member 1. The rotor shaft 22 of the rotor 2 is pivotally held by the bearing 14 inside of the axle tube 12 and retained in place by the retainer element 23. Next, the posts 31 of the die 3 are inserted through the through-holes 24 of the rotor 2 to bear against the flange 121 of the axle tube 12. The support element 15 or 16 are placed onto an upper end (as seen from FIG. 2) and then pressed by another die 32 to press the support element 15 or 16 into the axle tube 12. The support element 15 or 16 is thus tightly mounted in an end of the axle tube 12, best shown in FIGS. 3 and 4. The die 3 resists the pressure from the support element 15 or 16 during pressing process to prevent displacement of the axle tube 12, thereby providing reliable engagement. The support element 15 supports the rotor shaft 22 (FIG. 4). In the embodiment shown in FIG. 5, the support member 16 has a hole 161 in a bottom thereof and covered by the pad 17. Provision of the hole 161 allows the pad 17 to deform slightly in response to load from the rotor shaft 22 after long time use. Thus, the friction between the rotor shaft 22 and the pad 17 is reduced, thereby lengthening the life of the motor and reducing rotational noise.

According to the above description, it is appreciated that the support element that supports the rotor shaft can be engaged in the axle tube by pressing while undesired displacement of the axle tube during press process is prevented. In addition, the rotor includes through-holes for dissipating heat generated during rotation of the rotor, thereby providing a better heat-dissipating effect. The load from the rotor shaft 41 on the pad 17 may be absorbed by the slight deformation of the pad 17. The friction between the rotor shaft and the pad and rotational noise is thus reduced to thereby lengthen the life of the motor.

Although the invention has been explained in relation to its preferred embodiment as mentioned above, it is to be understood that many other possible modifications and variations can be made without departing from the spirit and scope of the invention. It is, therefore, contemplated that the appended claims will cover such modifications and variations that fall within the true scope of the invention.

What is claimed is:

1. A supporting structure for a rotor of a motor, comprising:

a fixing member including an axle seat, an axle tube being mounted on the axle seat and including a bearing mounted therein, a stator bobbin being mounted around the axle tube, the axle tube further including a flange formed on an end thereof, a support element being mounted to the other end of the axle tube, the support element including a recess defined in a bottom thereof and covered by a pad; and a rotor including a rotor shaft pivotally held by the bearing inside of the axle tube, the rotor shaft including an end supported by the pad, the rotor including a ring magnet for induction with the stator bobbin, thereby rotating about a fixed axis, the rotor including a plurality of through-holes on a top surface thereof, the through-holes aligned with the flange of the axle tube.

2. A supporting structure for a rotor of a motor, as claimed in claim 1 wherein the recess of a pad is a through-hole, the diameter of through-hole is less than that of the pad.

\* \* \* \* \*